United States Patent [19]

Gradert

[11] Patent Number: 5,048,867
[45] Date of Patent: Sep. 17, 1991

[54] AUTOMATIC LEVEL CONTROL SYSTEM FOR VEHICLES

[75] Inventor: Detlef Gradert, Nienhagen, Fed. Rep. of Germany

[73] Assignee: WABCO Westinghouse Fahrzeugbremsen GmbH, Hanover, Fed. Rep. of Germany

[21] Appl. No.: 530,095

[22] Filed: May 29, 1990

[30] Foreign Application Priority Data

May 30, 1989 [DE] Fed. Rep. of Germany ....... 3917458

[51] Int. Cl.$^5$ ................................................. B60S 9/00
[52] U.S. Cl. .................................... 280/840; 280/714; 280/DIG. 1
[58] Field of Search ............... 280/840, 707, 711, 714, 280/DIG. 1

[56] References Cited

U.S. PATENT DOCUMENTS

| | | | |
|---|---|---|---|
| 4,773,672 | 9/1988 | Deroche | 280/840 |
| 4,783,089 | 11/1988 | Hamilton et al. | 280/840 |
| 4,809,957 | 3/1989 | Schonfeld et al. | 280/711 |
| 4,834,418 | 3/1989 | Byma et al. | 280/711 |

FOREIGN PATENT DOCUMENTS

| | | |
|---|---|---|
| 1117351 | 11/1961 | Fed. Rep. of Germany . |
| 1262708 | 3/1968 | Fed. Rep. of Germany . |
| 1242916 | 5/1972 | Fed. Rep. of Germany . |
| 7440064 | 4/1975 | Fed. Rep. of Germany . |
| 3031453 | 3/1981 | Fed. Rep. of Germany . |
| 3542974 | 6/1987 | Fed. Rep. of Germany . |

*Primary Examiner*—Kenneth R. Rice
*Attorney, Agent, or Firm*—Horst M. Kasper

[57] ABSTRACT

An automatic level control device for vehicles is furnished with an electrically triggered shut-off valve (44). The shut-off valve (44) can be loaded with a pressure in closure direction corresponding to an air-suspension pressure. The force to be exerted by the electrical actuation device (23) for opening of the shut-off valve (44) is independent of the closure pressure loading the shut-off valve (44). The device components of the electrical actuation device (23) of the shut-off valve (44) can be furnished of small volume size and the passage cross-section of the shut-opff valve (44) can be formed of relatively large size. The device serves for automatic level control devices for vehicles.

28 Claims, 2 Drawing Sheets

AUTOMATIC LEVEL CONTROL SYSTEM FOR VEHICLES

BACKGROUND OF THE INVENTION

1. Field of the Invention

The invention relates to an automatic level control device for vehicles with air suspension based on which a vehicle chassis is spring-supported versus at least one vehicle axle.

2. Brief Description of the Background of the Invention Including Prior Art

Such an automatic level control device has been taught in the German Patent Application Laid Open DE-OS 3,031,453.

According to constructions of the conventional kind, the usually electrically actuatable shut-off valve or directional control valve, which valve usually is connected via a pressure line directly to the air spring, is formed as a seat valve such that the air pressure prevailing in the the air spring acts as a closure pressure on the seat valve. In this case, it is advantageously prevented that dynamically caused pressure changes could cause an unintended opening of the directional control valve based on a compression of the air spring.

This requires, however, that a force has to be furnished for the opening of the seat valve with the electrical actuation device. Said force has to overcome a maximum closure pressure, corresponding to a maximum air spring pressure in addition to the force of a usually present valve-closure spring. It is known in general that, in case of constructions of the precedingly mentioned kind, a quick response in case of automatic level controls can only be achieved by means of a corresponding passage capacity of the recited seat valve. The expansion of the passage cross-section of the seat valve, however, is limited as the force required for the opening of the seat valve also increases overproportionally with the expansion. This results in a disadvantageous way in relatively large device components of the electrical actuation device of the valve.

SUMMARY OF THE INVENTION

Purposes of the Invention

It is an object of the invention to provide an improved automatic level control device for vehicles with air suspension, where the force to be furnished by the electrical actuation device for opening of the seat valve is substantially independent of the closure pressure loading the seat valve.

It is a further object of the present invention to furnish an automatic level control device, where the components of the electrical actuation device of the seat valve are of small volume and where the passage cross-section of the seat valve is of a relatively large dimension.

It is yet a further object of the present invention to furnish a system which allows a quick and efficient automatic level adjustment of a vehicle chassis.

These and other objects and advantages of the present invention will become evident from the description which follows.

Brief Description of the Invention

The present invention provides for an automatic level control device for vehicles with air suspension. An air suspension system springingly supports the vehicle chassis against the vehicle axle. The air suspension system includes a level measurement device sensing a relative horizontal level of the vehicle chassis with respect to a relative horizontal level of the vehicle axle and having an output terminal providing an electrical output signal. An electronic control device is connected to the output terminal of the level measurement device and includes a stored set-point level value and a comparison device serving for a comparison of the output signal of the level measurement device with a set-point level value. A valve device is connected to the electronic control device and can be actuated with control output signals of the electronic control device. The valve device includes a directional control valve, with a valve body and a valve seat. The valve body applies, in the closure direction, a pressure of the air spring and the force of a valve closure spring onto the valve seat. The valve body can be lifted off the valve seat in opening direction by an actuation current of the electrical actuation device. An air spring is connected to an air spring pressure line. A first pneumatic port is furnished at the valve device. The first pneumatic port, is connected to the air spring via the air spring pressure line for loading the valve device with the pressure prevailing in the air spring and for controlling a filling of the air spring with gas from the pressure means source and for emptying the air spring with an output to the atmosphere. A second pneumatic port is disposed at the valve device and connected to the pressure means source. The second pneumatic port is loaded with the pressure of the pressure means source and can be connected with an output to the atmosphere. An electrical actuation device is disposed at the seat valve. An auxiliary pressure applies a force, parallel to the force exerted by the electrical actuation device for opening of the seat valve, for the emptying of the air spring. Said auxiliary pressure is exerted on the valve body against the pressure of the air spring and against the force of the valve closure spring. The auxiliary pressure, exerted on the seat valve, can be controlled by an electrical signal generated by an opening of the seat valve.

The directional valve can be formed as a control valve in the kind of a check valve.

The auxiliary pressure can be exerted onto the valve body by a connection of the second pneumatic port of the valve device to the pressure means source.

The auxiliary pressure, exerted onto the valve body, can be commanded by a first output signal of the level measurement device and can be fed to the electronic control device via a first signal input. The first output signal can correspond to a level setting at least equal to the set-point level. The auxiliary pressure, exerted onto the valve body, can be balanced by the first output signal of the level measurement device and a second output signal of the level measurement device. Said first output signal can be fed to the electrical control device via the first electrical signal input. The second output signal corresponds to a change of the first output signal of the level measurement device.

An electronic control device can be furnished. Said electronic control device can exhibit the first signal input and a second electrical signal input. An electrical signal can be fed to the electronic control device via the second electrical signal input. Said electrical signal can be triggered by a pressure corresponding to the auxiliary pressure at the second port of the first directional control valve. The auxiliary pressure, exerted onto the valve body, can be applied if the first output signal of the level measurement device is present at the first signal input of the electronic control device and if no signal is present at the second signal input.

A pressure switch can be loaded with a pressure corresponding to the pressure of the second port of the first directional control valve. The pressure switch can exhibit an electrical signal output. At said electric signal output an electrical signal can be generated at the second port by a pressure corresponding to the auxiliary pressure. The electrical signal output of the pressure switch can be connected by an electrical line with the second signal input of the electronic control device.

The second output signal of the level measurement device can serve for recognizing the switching state of the seat valve.

In another embodiment, the automatic level control device for vehicles with air suspension has a valve connected to the pressure means source. A first pneumatic port is disposed at the valve. A pneumatic spring is connected to the first pneumatic port. An electrical actuation device is incorporated into the valve for providing actuation of the valve. An electrical actuation device input is connected to the electrical actuation device. A first electronic control device output is disposed at the electronic control device. An electrical actuation device control line connects the electronic control device output to the electrical actuation device input. A first signal input is disposed at the electronic control device. A sensor connection line connects a level measurement device to the electronic control device. An electrical control output is disposed at the electronic control device. An electrical control input is disposed at the valve. An electrical line connects the electrical control output to the electrical control input.

The pneumatic spring can springingly support a vehicle chassis versus at least one vehicle axle. An output signal of the level measurement device can correspond to a distance from the vehicle chassis to the vehicle axle. The electronic control device can include a stored set-point level value and a comparison device serving for a comparing the output signal of the level measurement device with the set-point level value. Control output signals of the electronic control device can actuate the valve device. The valve device can be pneumatically connected to the pneumatic spring for filling the pneumatic spring with gas from the pressure means source and for emptying the pneumatic spring with an output to the atmosphere. The first pneumatic port can be charged with the pressure prevailing in the pneumatic spring.

The electrical actuation device can include a solenoid. The valve can comprise a first directional control valve associated with the solenoid and with the first pneumatic port. A second pneumatic port can be disposed at the first directional control valve. A second directional control valve can be associated with the pressure means source and can have a first control input. An output port can be disposed at the second directional control valve. A pneumatic port can be disposed at the second directional control valve. A pneumatic line can connect the pneumatic port to the second pneumatic port.

The second pneumatic port can be charged with the pressure of the pressure means source. The second pneumatic port can be connected via the output port to the atmosphere.

A second control input can be disposed at the second directional control valve. A second electrical control output can be disposed at the electronic control device. A second electrical line can connect the second electrical control output to the second control input.

A pressure line can connect the pressure switch via the pneumatic port and via a second pressure line to the second directional control valve. A second electrical signal input can be disposed at the electronic control device. An electrical signal output can connect the pressure switch to the electronic control device.

The electrical signal output can be fed to the electronic control device via an electrical line and the second electrical signal input. Said electrical signal output can be triggered by a pressure corresponding to the auxiliary pressure at the second pneumatic port of the first directional control valve.

The second directional control valve can include a valve seat having a central opening connected to the second pneumatic port. A valve closure spring can be disposed in the second directional control valve. A blocking stopper body for forming a seal with the valve seat can be actuated by the solenoid and retained in a closed position by a valve closure spring and by pressure prevailing in the pneumatic spring.

The blocking stopper body can exert, in the closure direction, a pressure of the pneumatic shock absorber and the force of the valve closure spring onto the valve seat. The electrical actuation device can lift the blocking stopper body in opening direction off the valve seat. An auxiliary pressure for supporting the electrical actuation device for opening of the seat valve for the emptying of the pneumatic spring can be exerted on the blocking stopper body against the pressure of the air spring and against the force of the valve closure spring. The auxiliary pressure, exerted onto the seat valve, can be controlled by an electrical signal generated by an opening of the seat valve. The auxiliary pressure can be exerted onto the valve body by opening the second directional control valve to furnish a connection from the pressure means source to the second pneumatic port. The auxiliary pressure, exerted onto the blocking stopper body, can be commanded by a first output signal of the level measurement device upon indication of excessive pressure in the pneumatic spring. The first output signal can be fed to the electronic control device via the measurement signal input. The first output signal can correspond to a level setting at least equal to the set-point level value.

The pressure switch can be loaded with a pressure corresponding to the pressure of the second pneumatic port of the first directional control valve. An electrical signal can be generated at the second pneumatic port by a pressure corresponding to the auxiliary pressure. The pressure-switch electrical signal output can be connected by a pressure switch signal line to the second signal input of the electronic control device. A second type output signal can correspond to an opening of the valve and can be furnished by the level measurement device. The second type output signal can serve for recognizing the switching state of the seat valve.

A method providing automatic level control for vehicles comprises the following steps. The set-point level for the relative position of a chassis of a vehicle is preset relative to a wheel axle of the vehicle.

The level change is caused by:
a) the distance between the vehicle chassis and the axle is decreased by means of charging the weight due to loading up;

b) the distance between the vehicle chassis and the axle is increased by means of discharging the weight due to unloading.

The level change is registered by a level change measurement device and generates a corresponding electrical sensor signal. The sensor signal is fed via a measurement signal input into an electrical control device. The sensor signal is compared in a comparison device to the stored set-point level signal. A presence of a level change is determined. The level change is reduced by moving a second directional control valve into such a valve position to allow a filling of the pneumatic shock absorber via corresponding control signals, delivered at the control outputs of the electronic control device with a second pneumatic port of a first directional control valve connected to the pressure-means source. An electronic actuation device of the first directional control valve is actuated via a control input receiving a control signal delivered at the control output of the electronic control device. A valve body is lifted off a valve seat with the support of the pressure of the pressure means source. The pressure acts onto the valve body in the opening direction of the seat valve. A pneumatic spring is connected via pressure lines to the pressure means source for such a time until the vehicle chassis reaches the set-point level by filling of the pneumatic spring. The pneumatic spring is filled to the set-point level of the chassis versus the road surface. The first directional control valve and the second directional control valve are switched back into the blocking position by the electronic control device.

The level change is caused by: the distance between the vehicle chassis and the axle is increased by means of discharging the weight due to unloading. valve can be provided only when an auxiliary pressure for supporting of the opening force of the electrical actuation device is applied on the valve body in the opening direction of the seat valve. With the comparison circuit of the electrical control device from a first output signal of the level measurement device it can be recognized that the pneumatic spring has to be partially emptied for reaching the set-point level. The second directional control can be switched such that a pressure line is connected via an exhaust vent to the atmosphere. The electrical actuation device of the first directional control valve can be actuated in order to open the seat valve. A first signal can be found in absence of a second signal. The second directional control valve can be induced to assume a switched position based on signals from the electronic control device. The pressure means source can be connected via the pressure line to the second pneumatic port of the first directional control valve. The valve body can be fed with an auxiliary pressure for supporting the electrical actuation device for opening of the seat valve against the pressure of the pneumatic spring and against the force of a valve spring. The pneumatic spring can be vented.

An opening of the seat valve can be recognized by the level measurement device as a level change with a difference signal representing the present level and of a set-point level value. The said difference signal can be supplied as a second signal to the electronic control device. Thereupon the second directional control valve can be induced to assume a switched position with the electronic control device. The pneumatic spring can be connected via the lines and via the open first directional control valve through the exhaust vent to the atmosphere. The first directional control valve and the second directional control valve of the electronic control device can be switched back into a blocking position for shut-off upon reaching of the set-point level value of the relative position of chassis versus wheel axle.

The presence of the auxiliary pressure can be recognized with the electronic control device required for the opening of the seat valve based on a corresponding electrical signal which can be transmitted from the pressure switch via the pressure switch electrical signal output and the second signal input of the electrical control device. With the electronic control device it can be recognized that no auxiliary pressure is present upon failure to receive the electrical signal of the pressure switch. Auxiliary pressure can be fed to the valve body by switching on of the pressure means source via the valve.

The second directional control valve can be kept open for a certain set-time value after the switching on of the pressure means source for feeding compressed air and for the generation of the auxiliary pressure. The opening time duration can be selected such that the auxiliary pressure for opening the seat valve is furnished with certainty in the pressure line. The second directional control valve can be moved into a switching position for emptying of the air spring. The second pneumatic port can be connected to the atmosphere via the exhaust vent.

The invention is associated with the advantage that, based on the small-volume structure of the electrical actuation device, a reduction in weight is possible resulting in a more favorable exploitation of the narrow device space available at the vehicle for the directional control valve.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

The device is furnished to compensate for load-caused level deviations or intentional set-point level changes by filling or emptying of the air suspension system. An air suspension system comprises such parts of an automotive vehicle that are intermediate between the wheels and the frame, and support the car body and frame by means of a cushion of air to absorb road shock caused by passage of the wheels over road irregularities.

In an automatic level control device for vehicles with air suspension, the air suspension springingly supports a vehicle chassis versus at least one vehicle axle. A level measurement device has an output signal corresponding to a distance between the vehicle chassis and the vehicle axle. An electrical control device includes a stored set-point level and a comparison device serving for a comparison of the output signal of the level measurement device with a set-point level. A valve device is actuatable with control output signals of the electronic control device. The valve device can be connected to an air spring for filling with gas from a pressure means source and for emptying with an output to the atmosphere. A first pneumatic port of the valve device port is loaded with the pressure prevailing in the air spring. A second pneumatic port of the valve device is loaded with the pressure of the pressure means source and can be connected with an output to the atmosphere. The valve device exhibits a directional control valve, formed as a control valve in the kind of a check valve, with a valve body and a valve seat. The valve body applies, in the closure direction, a pressure of the air spring and the force of a valve closure spring onto the valve seat. The valve body can be lifted in opening direction by the electrical actuation device off the valve seat. An auxiliary pressure for supporting the electrical actuation device 23 for opening of the seat valve 44 for the emptying of the air spring 1, is exerted on the valve body 24 against the pressure of the air spring 1 and against the force of the valve closure spring 26. The auxiliary pressure, exerted on the seat valve 44, can be controlled by an electrical signal generated by an opening of the seat valve 44.

The auxiliary pressure can be exerted onto the valve body 24 by a connection of the second pneumatic port 8 of the valve device 42 to the pressure means source 5. The auxiliary pressure, exerted onto the valve body 24, can be commanded by a first output signal of the level measurement device 11 feedable to the electronic control device 15 via a first signal input 14. The first output signal corresponds to a level setting at least equal to the set-point level. The auxiliary pressure, exerted onto the valve body 24, can be balanced by the first output signal of the level measurement device 11 and a second output signal of the level measurement device 11, feedable to the electrical control device 15 via the first electrical signal input 14. The second output signal corresponds to a change of the first output signal of the level measurement device 11.

An electronic control device 29 can exhibit the first signal input 14 and a second electrical signal input 35. An electrical signal can be fed to the electric control device 29 via the second electrical signal input 35. Said electrical signal can be triggered by a pressure corresponding to the auxiliary pressure at the second port 8 of the first directional control valve 2. The auxiliary pressure, exerted onto the valve body 24, can be triggered if the first output signal of the level measurement device 11 is present at the first signal input 14 of the electronic control device 29 and if no signal is present at the second signal input 35.

A pressure switch 30 can be loaded with a pressure corresponding to the pressure of the second port 8 of the first directional control valve 2. The pressure switch 30 can exhibit an electrical signal output 33. An electrical signal can be generated at the second port 8 of the electric signal output 33 by a pressure corresponding to the auxiliary pressure. The electrical signal output 33 of the pressure switch 30 can be connected by an electrical line with the second signal input 35 of the electronic control device 29.

The second output signal of the level measurement device 11 can serve for recognizing the switching state of the seat valve 44.

Figure 1:
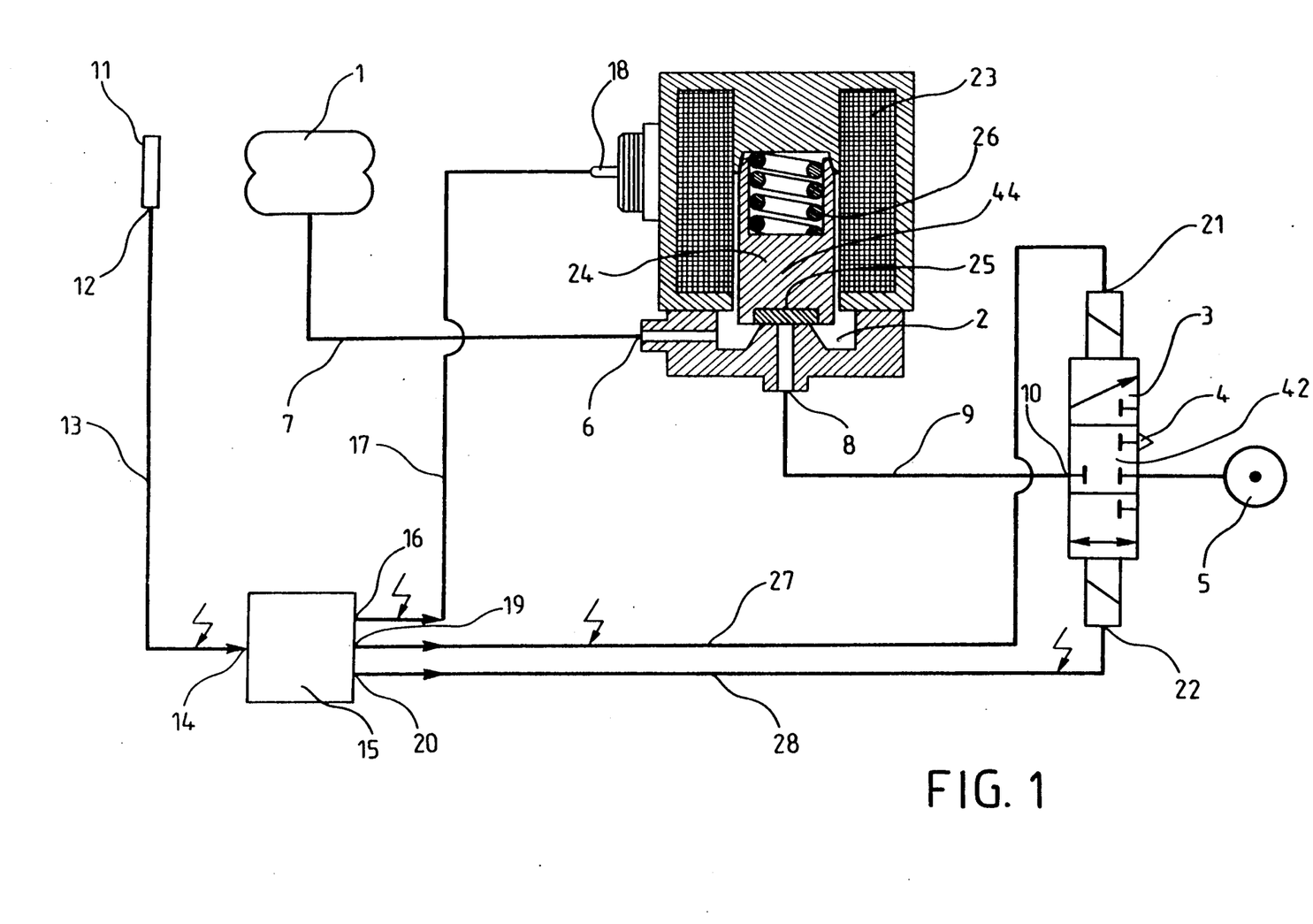
FIG. 1 is a schematic and in part sectional diagram illustrating an automatic level control device with a directional control valve, formed as a seat valve, for filling and emptying of an air suspension system.

FIG. 1 illustrates an air-suspension system which is representatively furnished by a single air spring 1. The air spring 1 can be selectively connected via a controllable valve device 42 to an exhaust vent 4 to the atmosphere, or to a pressure means source 5, or the air spring 1 can be blocked and separated against the atmosphere and against the pressure-means source 5. A valve device is used to regulate the flow of fluids in piping systems and machinery. A pressure means source can be a compressor or a tank containing compressed air.

The valve device 42 includes a first directional control valve 2, serving as an air suspension valve, having a first pneumatic port 6. The first pneumatic port 6 is connected via a first pressure line 7 to the air spring 1. A second pneumatic port 8 is connected via a second pressure line 9 to a first pneumatic port 10 of the second directional control valve 3. The port 10 can be connected from the blocking position illustrated in the drawing, by way of the directional control valve 3 to the pressure means source 5 or through the exhaust vent 4 to the atmosphere.

A level measurement device 11 is furnished for measuring the distance between the vehicle chassis and the vehicle axle and includes a signal output 12. A level measurement device is a device which compares the horizontal level position of a first item, such as for example the chassis of a vehicle, with the horizontal level of a second item, such as the axle of a vehicle, and generates an output signal which is preferably an electrical output signal. The signal output 12 is connected via an electrical line 13 to a first signal input 14 of an electronic control device 15. An electronic control device is a device which receives an electrical input signal, for example, from a sensor, processes the input signal based on certain settings or functions provided in the electronic control device, and generates an electrical output signal suitable to perform functions on other devices either directly or via intermediate final control elements or electrical actuation devices. The first signal input 14 can also be formed by several signal inputs connected to electrical lines 13. The electronic control device 15 exhibits a first electrical control output 16. The electrical control output 16 is connected via an electrical line 17 to a first electrical control input 18 of the first directional control valve 2. The electronic control device 15 exhibits additional electrical control outputs 19 and 20. The electrical control outputs 19 and 20 are connected via electrical lines 27 and 28 to electrical control inputs 21 and 22 of the second directional control valve 3.

The first directional control valve 2 exhibits an electrical actuation device 23, formed as a magnet valve or solenoid valve. A seat valve 44 is formed by a valve body 24 and a valve seat 25, which provides that a relative motion between body and seat can occur for actuation of the valve such that, in a closed position of the valve, a seal is formed between the valve body and the valve seat. The seat valve 44 is movable in the open position with the electrical actuation device 23. The seat valve 44 is maintained in closure position by the pressure of the air spring 1 acting in closure direction onto the valve body 24 and by the force of a valve closure spring 26.

Figure 2:
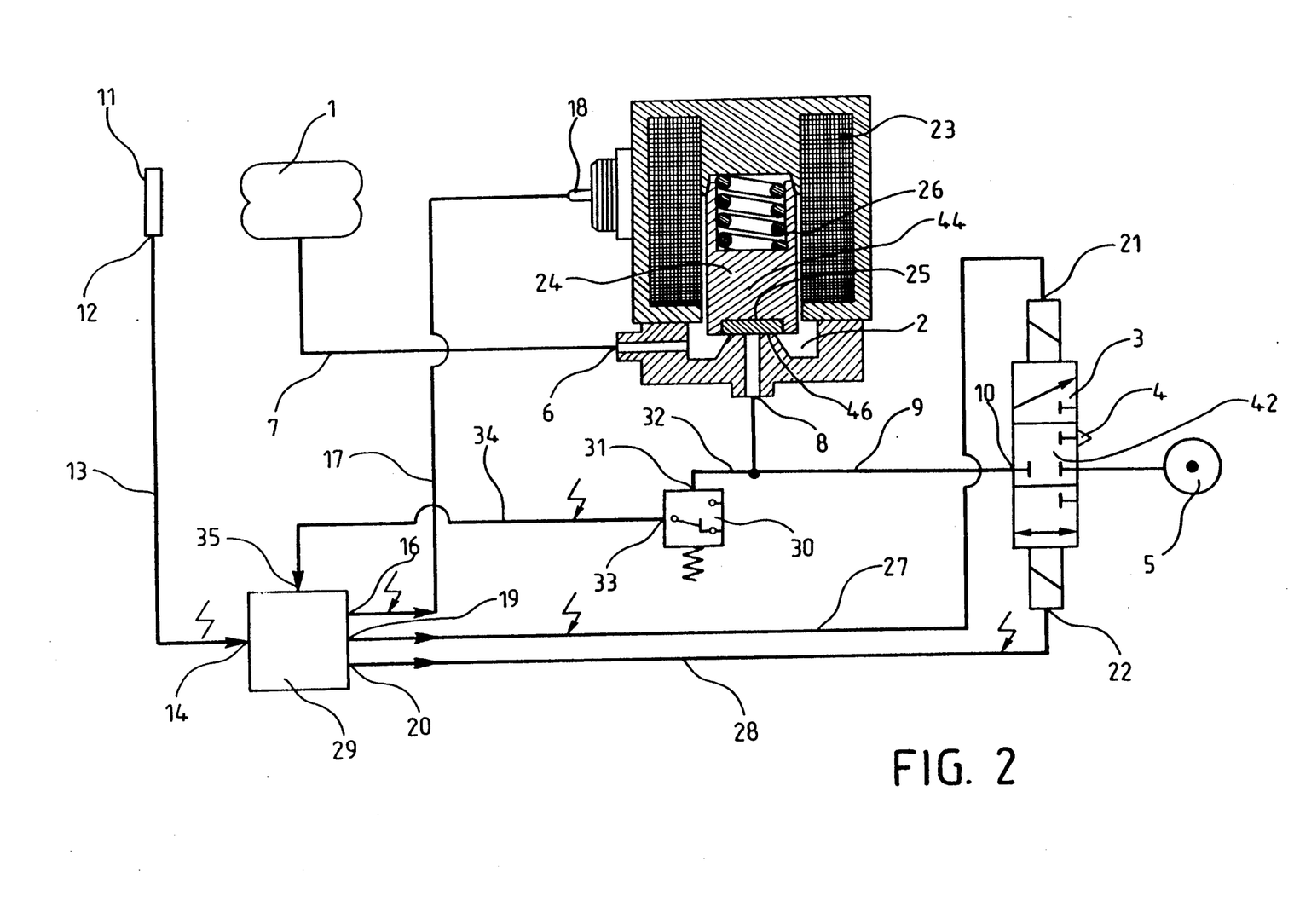
FIG. 2 is a schematic diagram of the embodiment according to FIG. 1 furnished additionally with a pressure switch.

The same device components of the embodiments of FIGS. 1 and 2 are furnished with the same reference numerals.

FIG. 2 illustrates, in addition to the device according to FIG. 1, a pressure switch 30. A pressure switch is a device which includes a connection to a pneumatic input and which includes electrical output terminals. Upon a change in the pressure level at the pneumatic input, the electrical characteristics of the output terminals of the pressure switch are changed. The pressure switch 30 is connected via a pneumatic port 31 and a pressure line 32 to the pressure line 9. The pressure switch 30 includes an electrical signal output 33. The electrical signal output 33 is connected via an electrical line 34 to a second electrical signal input 35 of an electrical control device 29.

The sensor of the level measurement device 11 has only the task of recognizing the level in the device according to FIG. 2, whereas the pressure switch 30 is responsible for the information whether a pressure support is required by the auxiliary pressure.

The mode of operation of the device according to FIG. 1 is as follows.

Raising the Level

The intent of this operation is to maintain substantially the level of a vehicle versus a road surface. A load-caused compression of the air suspension system, followed by spring-oscillation, has the result that the vehicle chassis is lowered to a level which is disposed below a preset set-point level. The level measurement device 11 registers this level change. This level change is fed via the first signal input 14 to the electronic control device 15. The comparison device of the electrical control device 15 recognizes, by comparing the output signal of the level measurement device 11 with the stored set-point level, that a level change is present, which has to be reduced by a filling of the air spring 1 to the set-point level of the chassis versus the road surface. The second directional control valve 3 is moved into such a valve position by corresponding control signals at the control outputs 19 and 20 of the electronic control device 15, wherein the port 8 of the directional control valve 2 is connected to the pressure-means source 5.

Simultaneously, the electrical actuation device of the first directional control valve 2 is actuated via the control input 18 by a control signal at the control output 16 of the electronic control device 15. Thereby, the valve body 24 is lifted off the valve seat 25 with the support of the pressure of the pressure means source 5, acting onto the valve body 24 in the opening direction of the seat valve 44. The air spring 1 is now connected via the pressure lines 7 and 9 to the pressure means source 5 for such a time until the vehicle chassis reaches the set-point level by filling of the air shock absorber 1. Subsequently, the first directional control valve 2 and the second directional control valve 3 are switched back into the blocking position by the electronic control device 15.

Lowering the Level

By unloading of the vehicle chassis, the vehicle chassis is lifted to a level which is above the preset set-point level. For a lowering to the set-point level, a venting of the air shock absorber 1 is necessary.

It is presupposed that the electrical actuation device 23, relative to its device size, is furnished such that an opening of the seat valve 44 is only possible when an auxiliary pressure for supporting of the opening force of the electrical actuation device 23 is effective on the valve body 24 in the opening direction of the seat valve 44. It is furthermore presupposed that such an auxiliary pressure is not present at the start of the venting process.

After the comparison circuit of the electrical control device 15 has recognized from a first output signal of the level measurement device 11 that the air spring 1 has to be partially emptied for furnishing the set-point level, the second directional control 3 is switched such that the pressure line 9 is connected via the exhaust vent 4 to the atmosphere. Simultaneously or, advantageously, preceding to the switching of the second directional control valve 3, the electrical actuation device 23 of the first directional control valve 2 is actuated in order to open the seat valve 44. The pressure of the air spring 1, acting on the valve body 24 in the closure direction of the seat valve 44, prevents however an opening of the seat valve 44. A second signal of the level measurement device 11, which would correspond to a level change or, respectively, to a change of the first signal, can thereby not occur, since a level change cannot occur because of the unopened seat valve 44.

Upon occurrence of the first signal and a lack of a second signal, the electronic control device 15 induces the second directional control valve 3 to assume a switched position, wherein the pressure means source 5 is connected via the pressure line 9 to the second port 8 of the first directional control valve 2. Thereby, the valve body 24 is fed with an auxiliary pressure for supporting the electrical actuation device 23 for opening of the seat valve 44 against the pressure of the air spring 1 and against the force of the valve spring 26.

The valve body 24 could also be fed with the auxiliary pressure via a different port, not illustrated, of the first directional control valve 2. The pressure-impacted face of the valve body 24, to be fed with the auxiliary pressure, would then be formed, for example, as an annular face, which would close off the pressure chamber of the first directional control valve 2.

The opening of the seat valve 44 is recognized by the level measurement device 11 as a level change, for example, by electronic difference formation of a difference signal representing the present level and of a set-point signal. The said difference signal is supplied as a second signal to the electronic control device 15. The electronic control device 15 induces thereupon the second directional control valve 3 to assume a switched position, wherein the air spring 1 is connected via the lines 7 and 9 and via the open first directional control valve 2 to the exhaust vent 4 to the atmosphere. Upon reaching of the set-point level, the first directional control valve 2 and the second directional control valve 3 of the electronic control device 15 are again switched back into a blocking position for shut-off.

The occurrence of the first signal and, in connection therewith, the occurrence of the second signal means that, after a preceding automatic level control process, an auxiliary pressure has remained in the pressure line 9. An opening of the seat valve 44 in the sense of the above recited switching on of the pressure means source 5 does consequently not occur before the emptying of the air spring 1.

The mode of operation of the device according to FIG. 2 is as follows.

The raising of the vehicle chassis to the set-point level occurs as described in the mode of operation of the device according to FIG. 1.

Lowering of the Level

The construction according to FIG. 2 takes into consideration that after termination of a level change process a residual pressure can be remaining in the pressure line 9. This residual pressure could also correspond to the pressure level of the auxiliary pressure. The residual pressure in the pressure line 9, corresponding to the auxiliary pressure, effects a closing of the pressure switch 30. The electrical control device 29 recognizes the presence of the auxiliary pressure required for the opening of the seat valve 44 based on a corresponding electrical signal which is transmitted from the pressure switch 30 via the signal output 33 and the second signal input 35 of the electrical control device 29. In this case, an unnecessary switching of the second directional control valve 3 to the pressure means source 5 for a generation of the auxiliary pressure is prevented. The electrical control device 29 registers that no auxiliary pressure is present upon failure to receive the electrical signal of the pressure switch 30. As a consequence thereof there occurs the feeding of auxiliary pressure onto the valve body 24 by switching on of the pressure means source 5 via valve 3.

It is alternatively disclosed that the second directional control valve 3 remains opened for a certain set-time value after the switching on of the pressure means source 5 for feeding compressed air and for the generation of the auxiliary pressure. The opening time is to be selected such that the auxiliary pressure for opening the seat valve 44 is furnished with certainty in the pressure line 9. Subsequently, the second directional control valve 3 is moved into a switching position for emptying of the air spring 1, where the second pneumatic port 8 is connected to the atmosphere via the exhaust vent 4.

The set-point level stored in the electronic control device, reference numeral 15 in FIG. 1 and reference numeral 29 in FIG. 2, can also be adjustable such that an arbitrarily desired level change of the vehicle chassis could be performed.

It will be understood that each of the elements described above, or two or more together, may also find a useful application in other types of level control systems differing from the types described above.

While the invention has been illustrated and described as embodied in the context of an automatic level control system for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An automatic level control device for vehicles with air suspension comprising
a vehicle chassis;
a vehicle axle;
an air suspension system spring-supporting the vehicle chassis against the vehicle axle, wherein the air suspension system includes
a level measurement device sensing a relative horizontal level of the vehicle chassis with respect to a relative horizontal level of the vehicle axle and having an output terminal providing an electrical output signal;
an electronic control device connected to the output terminal of the level measurement device and including a stored set-point level value and a comparison device serving for a comparison of the output signal of the level measurement device with a set-point level value;
a pressure means source;
a valve device connected to the electronic control device and actuatable with control output signals of the electronic control device, and wherein the valve device includes a directional control valve, with a valve body and a valve seat, where the valve body exerts, in the closure direction, a pressure of the air spring and the force of a valve closure spring onto the valve seat, and where the valve body can be lifted off the valve seat in opening direction by an actuation current of the electrical actuation device;
an air spring connected to an air spring pressure line;
a first pneumatic port furnished at the valve device, where the first pneumatic port is connected to the air spring via the air spring pressure line for loading the valve device with the pressure prevailing in the air spring and for controlling a filling of the air spring with gas from the pressure means source and for emptying the air spring with an output to the atmosphere;
a second pneumatic port disposed at the valve device and connected to the pressure means source, where the second pneumatic port is loaded with the pressure of the pressure means source and can be connected with an output to the atmosphere;
an electrical actuation device disposed at the seat valve, wherein an auxiliary pressure applies a force, parallel to the force exerted by the electrical actuation device for opening of the seat valve, for the emptying of the air spring, which auxiliary pressure is exerted on the valve body against the pressure of the air spring and against the force of the valve closure spring, and wherein the auxiliary pressure, exerted on the seat valve, can be controlled by an electrical signal generated by an opening of the seat valve.

2. The automatic level control device according to claim 1, wherein the directional valve is formed as a control valve in the kind of a check valve.

3. The automatic level control device according to claim 1, wherein the auxiliary pressure is exerted onto the valve body by a connection of the second pneumatic port of the valve device to the pressure means source.

4. The automatic level control device according to claim 1, wherein the auxiliary pressure, exerted onto the valve body, is commanded by a first output signal of the level measurement device and is fed to the electronic control device via a first signal input, where the first output signal corresponds to a level setting at least equal to the set-point level;
wherein the auxiliary pressure, exerted onto the valve body, is balanced by the first output signal of the level measurement device and a second output signal of the level measurement device, wherein said first output signal is to be fed to the electrical control device via the first electrical signal input, where the second output signal corresponds to a change of the first output signal of the level measurement device.

5. The automatic level control device according to claim 4, wherein an electronic control device is furnished, which exhibits the first signal input and a second electrical signal input, where an electrical signal can be fed to the electronic control device via the second electrical signal input, which electrical signal can be triggered by a pressure corresponding to the auxiliary pressure at the second port of the first directional control valve;

wherein the auxiliary pressure, exerted onto the valve body, is applied if the first output signal of the level measurement device is present at the first signal input of the electronic control device and if no signal is present at the second signal input.

6. The automatic level control device according to claim 5, further comprising a pressure switch, where the pressure switch can be loaded with a pressure corresponding to the pressure of the second port of the first directional control valve;

wherein the pressure switch exhibits an electrical signal output, at which electric signal output an electrical signal can be generated at the second port by a pressure corresponding to the auxiliary pressure;

wherein the electrical signal output of the pressure switch is connected by an electrical line with the second signal input of the electronic control device.

7. The automatic level control device according to claim 4, wherein the second output signal of the level measurement device serves for recognizing the switching state of the seat valve.

8. An automatic level control device for vehicles with air suspension, wherein the air suspension spring-supports a vehicle chassis versus at least one vehicle axle, comprising a) a level measurement device having an output signal corresponding to a distance between the vehicle chassis and the vehicle axle;

b) an electrical control device including a stored set-point level and a comparison device serving for a comparison of the output signal of the level measurement device with a set-point level;

c) a valve device actuatable with control output signals of the electronic control device, where the valve device can be connected to an air spring for filling with gas from a pressure means source and for emptying with an output to the atmosphere;

d) a first pneumatic port of the valve device, where the first pneumatic port is loaded with the pressure prevailing in the air spring;

e) a second pneumatic port of the valve device, where the second pneumatic port is loaded with the pressure of the pressure means source and can be connected with an output to the atmosphere;

wherein the valve device exhibits a directional control valve, formed as a control valve in the kind of a check valve, with a valve body and a valve seat, where the valve body exerts, in the closure direction, a pressure of the air spring and the force of a valve closure spring onto the valve seat and where the valve body can be lifted in opening direction by the electrical actuation device off the valve seat;

wherein an auxiliary pressure for supporting the electrical actuation device (23) for opening of the seat valve (44) for the emptying of the air spring (1), is exerted on the valve body (24) against the pressure of the air spring (1) and against the force of the valve closure spring (26);

wherein the auxiliary pressure, exerted on the seat valve (44), can be controlled by an electrical signal generated by an opening of the seat valve (44).

9. The automatic level control device according to claim 8, wherein the auxiliary pressure can be exerted onto the valve body (24) by a connection of the second pneumatic port (8) of the valve device (42) to the pressure means source (5).

10. The automatic level control device according to claim 8, wherein the auxiliary pressure, exerted onto the valve body (24), can be commanded by a first output signal of the level measurement device (11) feedable to the electronic control device (15) via a first signal input (14), where the first output signal corresponds to a level setting at least equal to the set-point level;

wherein the auxiliary pressure, exerted onto the valve body (24), can be balanced by the first output signal of the level measurement device (11) and a second output signal of the level measurement device (11), feedable to the electrical control device (15) via the first electrical signal input (14), where the second output signal corresponds to a change of the first output signal of the level measurement device (11).

11. The automatic level control device according to claim 10, wherein an electronic control device (29) is furnished, which exhibits the first signal input (14) and a second electrical signal input (35), where an electrical signal can be fed to the electric control device (29) via the second electrical signal input (35), which electrical signal can be triggered by a pressure corresponding to the auxiliary pressure at the second port (8) of the first directional control valve (2); wherein the auxiliary pressure, exerted onto the valve body (24), can be triggered if the first output signal of the level measurement device (11) is present at the first signal input (14) of the electronic control device (29) and if no signal is present at the second signal input (35).

12. The automatic level control device according to claim 11, further comprising a pressure switch (30), where the pressure switch (30) can be loaded with a pressure corresponding to the pressure of the second port (8) of the first directional control valve (2);

wherein the pressure switch (30) exhibits an electrical signal output (33), wherein an electrical signal can be generated at the second port (8) of the electric signal output (33) by a pressure corresponding to the auxiliary pressure;

wherein the electrical signal output (33) of the pressure switch (30) is connected by an electrical line with the second signal input (35) of the electronic control device (29).

13. The automatic level control device according to claim 10, wherein the second output signal of the level measurement device (11) serves for recognizing the switching state of the seat valve (44).

14. An automatic level control device for vehicles with air suspension, comprising
- a pressure means source;
- a valve connected to the pressure means source;
- a first pneumatic port disposed at the valve;
- a pneumatic spring connected to the first pneumatic port;
- an electrical actuation device incorporated into the valve for providing actuation of the valve;
- an electrical actuation device input connected to the electrical actuation device;
- an electronic control device;
- a first electronic control device output disposed at the electronic control device;
- an electrical actuation device control line connecting the electronic control device output to the electrical actuation device input;
- a level measurement device;
- a first signal input disposed at the electronic control device;
- a sensor connection line connecting the level measurement device to the electronic control device;
- an electrical control output disposed at the electronic control device;
- an electrical control input disposed at the valve;
- an electrical line connecting the electrical control output to the electrical control input.

15. The automatic level control device for vehicles according to claim 14,
- wherein the pneumatic spring spring-supports a vehicle chassis versus at least one vehicle axle;
- wherein an output signal of the level measurement device corresponds to a distance from the vehicle chassis to the vehicle axle;
- wherein the electronic control device includes a stored set-point level value and a comparison device serving for a comparing the output signal of the level measurement device with the set-point level value;
- wherein control output signals of the electronic control device actuate the valve device;
- wherein the valve device can be pneumatically connected to the pneumatic spring for filling the pneumatic spring with gas from the pressure means source and for emptying the pneumatic spring with an output to the atmosphere;
- wherein the first pneumatic port is charged with the pressure prevailing in the pneumatic spring.

16. The automatic level control device for vehicles according to claim 14, wherein
- the electrical actuation device includes a solenoid; the valve comprises a first directional control valve associated with the solenoid and with the first pneumatic port;
- a second pneumatic port disposed at the first directional control valve;
- a second directional control valve associated with the pressure means source and having a first control input; an output port disposed at the second directional control valve;
- a pneumatic port disposed at the second directional control valve; a pneumatic line connecting the pneumatic port to the second pneumatic port.

17. The automatic level control device for vehicles according to claim 16,
- wherein the second pneumatic port is charged with the pressure of the pressure means source;
- wherein the second pneumatic port is connectable via the output port to the atmosphere.

18. The automatic level control device for vehicles according to claim 16, further comprising
- a second control input disposed at the second directional control valve;
- a second electrical control output disposed at the electronic control device;
- a second electrical line connecting the second electrical control output to the second control input.

19. The automatic level control device for vehicles according to claim 16, further comprising
- a pressure switch;
- a pressure line connecting the pressure switch via the pneumatic port and via a second pressure line to the second directional control valve;
- a second electrical signal input disposed at the electronic control device;
- an electrical signal output connecting the pressure switch to the electronic control device.

20. The automatic level control device for vehicles according to claim 19,
- wherein the electrical signal output is to be fed to the electronic control device via an electrical line and the second electrical signal input, which electrical signal output can be triggered by a pressure corresponding to the auxiliary pressure at the second pneumatic port of the first directional control valve.

21. The automatic level control device for vehicles according to claim 16, wherein
- the second directional control valve includes a valve seat having a central opening connected to the second pneumatic port;
- a valve closure spring disposed in the second directional control valve; an actuatable blocking stopper body for forming a seal with the valve seat and actuatable by the solenoid and retained in a closed position by a valve closure spring and by pressure prevailing in the pneumatic spring.

22. The automatic level control device for vehicles according to claim 21,
- wherein the blocking stopper body exerts, in the closure direction, a pressure of the pneumatic spring and the force of the valve closure spring onto the valve seat and wherein the electrical actuation device can lift the blocking stopper body in opening direction off the valve seat;
- wherein an auxiliary pressure for supporting the electrical actuation device for opening of the seat valve for the emptying of the pneumatic spring is exerted on the blocking stopper body against the pressure of the air spring and against the force of the valve closure spring; wherein the auxiliary pressure, exerted onto the seat valve, is controlled by an electrical signal generated by an opening of the seat valve;
- wherein the auxiliary pressure is exerted onto the valve body by opening the second directional control valve to furnish a connection from the pressure means source to the second pneumatic port;
- wherein the auxiliary pressure, exerted onto the blocking stopper body, is commanded by a first output signal of the level measurement device upon indication of excessive pressure in the pneumatic spring, and wherein the first output signal is fed to the electronic control device via the measurement signal input, and wherein the first output signal corresponds to a level setting at least equal to the set-point level value.

23. The automatic level control device for vehicles according to claim 21,
wherein the pressure switch can be loaded with a pressure corresponding to the pressure of the second pneumatic port of the first directional control valve;
an electrical signal output, wherein an electrical signal can be generated at the second pneumatic port by a pressure corresponding to the auxiliary pressure;
wherein the pressure-switch electrical signal output is connected by a pressure switch signal line to the second signal input of the electronic control device;
wherein a second type output signal corresponds to an opening of the valve and is furnished by the level measurement device and wherein the second type output signal serves for recognizing the switching state of the seat valve.

24. A method providing automatic level control for vehicles comprising
presetting a set-point level for the relative position of a chassis of a vehicle relative to a wheel axle of the vehicle;
lowering the vehicle chassis to a level which is disposed below the present set-point level by means of load-caused compression of the air suspension system of the vehicle, followed by spring-oscillation;
registering the level change by a level change measurement device and generating a corresponding electrical sensor signal;
feeding the sensor signal via a measurement signal input into an electronic control device;
comparing the sensor signal in a comparison device to the stored set-point level signal;
determining a presence of a level change;
reducing the level change by moving a second directional control valve into such a valve position allowing a filling of the pneumatic spring via corresponding control signals, delivered at the control outputs of the electronic control device with a second pneumatic port of a first directional control valve connected to the pressure-means source;
actuating an electrical actuation device of the first directional control valve via a control input receiving a control signal delivered at the control output of the electronic control device;
lifting a valve body off a valve seat with the support of the pressure of the pressure means source, wherein the pressure acts onto the valve body in the opening direction of the seat valve;
connecting a pneumatic spring via pressure lines to the pressure means source for such a time until the vehicle chassis reaches the set-point level by filling of the pneumatic spring;
filling of the pneumatic spring to the set-point level of the chassis versus the road surface;
switching the first directional control valve and the second directional control valve back into the blocking position by the electronic control device.

25. The method providing automatic level control for vehicles according to claim 24 further comprising lifting the vehicle chassis to a level which is above the preset set-point level by unloading of the vehicle chassis;
providing an opening of the seat valve only when an auxiliary pressure for supporting of the opening force of the electrical actuation device is applied on the valve body in the opening direction of the seat valve;
recognizing with the comparison circuit of the electrical control device from a first output signal of the level measurement device that the pneumatic spring has to be partially emptied for reaching the set-point level; switching the second directional control such that a pressure line is connected via an exhaust vent to the atmosphere;
actuating the electrical actuation device of the first directional control valve in order to open the seat valve; finding a first signal in absence of a second signal; inducing the second directional control valve to assume a switched position based on signals from the electronic control device;
connecting the pressure means source via the pressure line to the second pneumatic port of the first directional control valve;
feeding the valve body with an auxiliary pressure for supporting the electrical actuation device for opening of the seat valve against the pressure of the pneumatic spring and against the force of a valve spring; venting of the pneumatic spring.

26. The method providing automatic level control for vehicles according to claim 24, further comprising recognizing an opening of the seat valve by the level measurement device as a level change with a difference signal representing the present level and of a set-point level value;
supplying the said difference signal as a second signal to the electronic control device;
inducing thereupon the second directional control valve to assume a switched position with the electronic control device;
connecting the pneumatic spring via the lines and via the open first directional control valve through the exhaust vent to the atmosphere;
switching back of the first directional control valve and of the second directional control valve of the electronic control device into a blocking position for shut-off upon reaching of the set-point level value of the relative position of chassis versus wheel axle.

27. The method providing automatic level control for vehicles according to claim 24, further comprising recognizing the presence of the auxiliary pressure with the electronic control device required for the opening of the seat valve based on a corresponding electrical signal which is transmitted from the pressure switch via the pressure switch electrical signal output and the second signal input of the electrical control device;
registering with the electronic control device and that no auxiliary pressure is present upon failure to receive the electrical signal of the pressure switch;
feeding auxiliary pressure to the valve body by switching on of the pressure means source via the valve.

28. The method providing automatic level control for vehicles according to claim 24, further comprising keeping the second directional control valve open for a certain set-time value after the switching on of the pressure means source for feeding compressed air and for the generation of the auxiliary pressure;

selecting the opening time duration such that the auxiliary pressure for opening the seat valve is furnished with certainty in the pressure line;

moving the second directional control valve into a switching position for emptying of the air shock absorber;

connecting the second pneumatic port to the atmosphere via the exhaust vent.

* * * * *